(No Model.)

A. C. SCHAEFER & H. J. GRAY.
DRIVE CHAIN AND CHAIN WHEEL.

No. 566,230.   Patented Aug. 18, 1896.

Witnesses,
Robert Emmett,
Albert H. Norris.

Inventors,
August C. Schaefer.
Henry J. Gray.
By James L. Norris.
Atty.

UNITED STATES PATENT OFFICE.

AUGUST C. SCHAEFER AND HENRY J. GRAY, OF ST. PAUL, MINNESOTA.

DRIVE-CHAIN AND CHAIN-WHEEL.

SPECIFICATION forming part of Letters Patent No. 566,230, dated August 18, 1896.

Application filed May 23, 1896. Serial No. 592,796. (No model.)

*To all whom it may concern:*

Be it known that we, AUGUST C. SCHAEFER and HENRY J. GRAY, citizens of the United States, residing at St. Paul, in the county of Ramsey and State of Minnesota, have invented new and useful Improvements in Drive-Chains and Chain-Wheels, of which the following is a specification.

This invention has for its objects to provide a new and improved drive-chain for chain-wheels, wherein the chain-links can be readily assembled and operatively connected together and detached or separated whenever required; to provide a strong, substantial, durable, and effective construction of the parts without, however, increasing the weight of the chain; to provide an improved construction which enables the end links of the chain to be conveniently and quickly connected to form an endless chain; to provide a new construction and arrangement of the links to produce an elastic chain, which, however, possesses the requisite rigidity or stiffness and strength required in a drive-chain, and to provide a chain having the links composed of elastic plates and detachably or separably connected by cross-pins, which are adapted to rotate and rest at their ends against peripheral portions of the wheel as the chain moves around the circumference thereof. To accomplish all these objects our invention involves the features of construction and the combination or arrangement of parts hereinafter described and claimed, reference being made to the accompanying drawings, in which—

Figure 1:
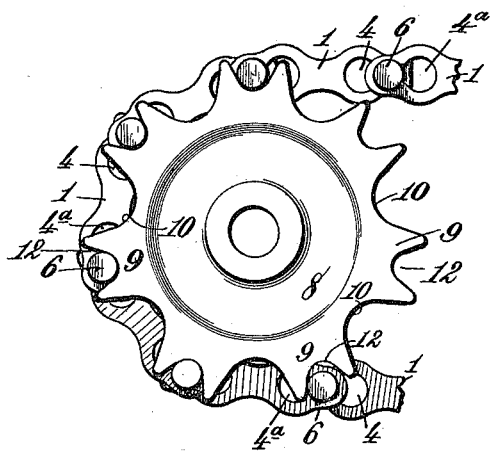
Figure 2:
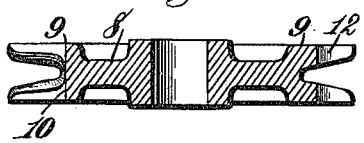
Figure 3:
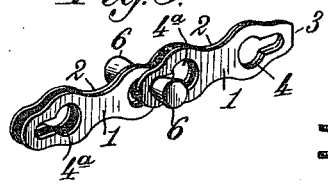
Figure 4:
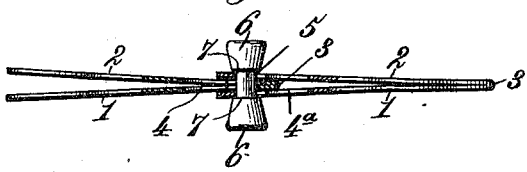
Figure 5:
Figure 6:
Figure 7:
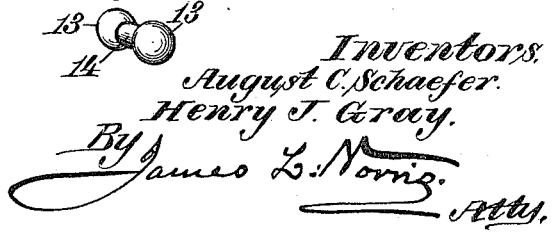

Figure 1 is a side elevation of a chain-wheel and a portion of an endless chain constructed according to our invention and arranged in operative connection with said wheel. Fig. 2 is a plan view of the same. Fig. 3 is a perspective view of a portion of a chain constructed according to our invention. Fig. 4 is an edge view of a portion of the chain, partly in section, to more clearly illustrate the manner in which the link-plates of the links engage the central portion of the cross-pins, and by their normal tendency to extend or spread laterally to hold the pins steadily while permitting them to rotate axially. Fig. 5 is a detail perspective view of one of the links. Fig. 6 is a detail perspective view of one of the cross-pins, and Fig. 7 is a detail perspective view showing a modified construction of cross-pin.

In order to enable those skilled in the art to make and use our invention, we will now describe the same in detail, referring to the drawings, wherein—

The numerals 1 and 2 indicate the side plates which constitute a link. The side plates are preferably formed from a single piece of metal folded upon itself centrally between its extremities, so that the bend, as at 3, constitutes a connection between the plates at one end thereof and the latter lie beside one another, and for a certain portion of their length are contiguous, while their disconnected or unattached end portions are susceptible of extending, springing, or spreading laterally, due to the inherent elasticity of the metal of which the parts are composed. We preferably construct the plates of steel; but they may be made of any metal suitable for the purpose.

The edges of the plates are preferably constructed with undulating edges to produce a symmetrical appearance, and a construction which will accurately accommodate and adapt itself to the chain-wheel hereinafter explained.

The elastic plates 1 and 2 of each chain-link are each constructed at its end portions with keyhole-slots 4 and $4^a$, which comprise a comparatively narrow portion and a comparatively wide portion opening into the narrow portion. The body of each link-plate, intermediate the keyhole-slots at the ends thereof, is or may be solid or imperforate. The two plates composing one link are detachably, or separably, connected with the two plates of a contiguous link through the medium of a removable and replaceable cross-pin, constructed with a central cylindrical body 5, having attached heads 6. The heads 6 are each preferably in the form of a truncated cone with the ends of least diameter presented toward one another to form shoulders 7. The conoidal heads 6 of the cylindrical body 5 are susceptible of passing through the enlarged or comparatively wide portions of the keyhole-slots, while the cylindrical body portion 5 is adapted to enter and more or less accurately fit the narrow portions of the slots, so that by introducing the ends of two link-plates between the ends of two other link-plates until the enlarged or comparatively wide portions of all the keyhole-slots at these ends of the plates register, the cross-pin can be inserted into position until the central body portion 5 is coincident with the narrow portions of the slots. The two plates of the one link-section are then moved longitudinally with reference to the two plates of the other link-section, so that the cylindrical body of the cross-pin will lie in the contracted portions of the keyhole-slots. The tendency of the two plates of each link to extend or spread laterally causes them to press against the shoulders 7 of the cross-pin, thereby holding the latter steady and preventing it from shifting laterally, while enabling the same to rotate axially in the narrow portions of the keyhole-slots.

A series of links constructed in the manner described and shown is connected together through the medium of cross-pins, as above explained, until a chain of the required length is obtained, when the end links of this chain can be connected, either through the medium of one of the cross-pins described and shown or by any other suitable means for the purpose of producing an endless chain. This chain is specially adapted to the chain-wheel 8, (illustrated in Figs. 1 and 2,) which is formed at its peripheral portions with forked or bifurcated sprockets 9, and with concavities or semicircular depressions 10 intermediate the forked sprockets. The conoidal heads of the cross-pins are adapted to fit into the notches 12, formed in each member of each fork 9, while the connected links composing the chain are adapted to lie in the space between the members of each fork, whereby the line of draft is directly in the center, and by this means it is possible to make the chain comparatively light in weight, while securing the requisite strength and durability. During the rotation of the chain-wheel and the movement of the chain around the circumference thereof, the connecting cross-pins are susceptible of rotating axially in the notches 12 of the members composing the forks 9, thereby reducing the power required to drive the chain, and diminishing the wear on the cross-pins and on the wheel.

Instead of constructing the enlarged heads 6 of the cross-pins of conoidal form we may construct them of spherical form, as shown in the modified construction, Fig. 7, in which figure the numerals 13 indicate the spherical heads connected by the cylindrical body portion 14, as will be clearly understood without further explanation.

By constructing each link of two contiguous elastic plates in the manner explained we produce an elastic drive-chain and one wherein the link-plates will extend, spread, or spring laterally at one end to press against the shoulders 7 at the inner sides of the heads 6, which we regard as a new and useful improvement in this class of devices.

Although we have described the two plates of each link as formed of a single piece of metal bent centrally between its extremities, so that the two plates are connected by the bend, we wish it understood that we do not limit ourselves to this precise construction, as obviously each link can be made of two separate plates placed side by side.

The link-plates can be conveniently and rapidly manufactured by suitable dies, which will cut the link-blanks from sheet metal; but of course the links, constructed as described, can be manufactured in any suitable manner or by any suitable machinery.

By our invention we provide a new and improved drive-chain having the links and connecting-pins so constructed that they can be quickly assembled and operatively connected and as quickly detached or separated, if desired.

A chain constructed according to our invention possesses the desirable qualities of strength and durability, and it will be found very effective in practicable use. The improved construction enables the chain to be made very strong without increasing its weight, while it can be very economically manufactured.

Our improved chain can be used for any purpose for which a chain is ordinarily used; but we design it particularly for chain-blocks, harvesters, grappling apparatus, bicycles, tricycles, and other vehicles which are operated by drive-chains.

Having thus described our invention, what we claim is—.

1. A drive-chain, consisting of a series of links, each composed of two link-plates lying side by side and provided with registering keyhole-slots, and removable and replaceable connecting cross-pins journaled centrally between their ends in the narrow portions of the keyhole-slots and having their ends extending laterally from opposite sides of the link-plates to bear against and rotate on peripheral portions of a chain-wheel, substantially as described.

2. A drive-chain, consisting of a series of links, each composed of two link-plates lying side by side and provided at each end with registering keyhole-slots, and removable and replaceable connecting cross-pins journaled centrally between their ends in the narrow portions of the keyhole-slots, axially rotatable therein and having their heads of a greater diameter than their body portions and extending laterally from opposite sides of the link-plates to bear against and roll upon peripheral portions of a chain-wheel, substantially as described.

3. A drive-chain, consisting of a series of links, each composed of two elastic plates lying side by side and provided with registering keyhole-slots, and removable and replaceable connecting cross-pins, each having a cylindrical body portion and two enlarged heads, said elastic plates having the narrow portions of their keyhole-slots engaging the cylindrical body portions of the cross-pins and by their lateral elasticity pressing themselves against the inner sides of the heads of the cross-pins, substantially as described.

4. A drive-chain, consisting of a series of links, each composed of laterally-expansible link-plates constructed with registering keyhole-slots, and removable and replaceable cross-pins having enlarged heads and journaled intermediate said heads in the narrow portions of the keyhole-slots, said elastic plates of each link by their lateral expansion pressing against the inner sides of the heads of the cross-pins, substantially as described.

5. A drive-chain, consisting of a series of links, each composed of two elastic plates lying side by side and provided at each end with registering keyhole-slots, and removable and replaceable connecting cross-pins journaled centrally between their ends in the narrow portions of the keyhole-slots, rotatable therein and having enlarged heads extending laterally from opposite sides of the link-plates to bear against and roll upon peripheral portions of a chain-wheel, said link-plates, by their inherent elasticity, tending to expand laterally and press against the inner sides of the heads of the cross-pins, substantially as described.

6. The combination of a chain-wheel having its peripheral portion provided with forks 9 having notches, and concavities, or semicircular portions between the forks, each fork comprising two separated members, with a drive-chain composed of a plurality of links detachably connected by removable and replaceable cross-pins having enlarged heads to engage the notches in the forks of the wheel, substantially as described.

7. A drive-chain consisting of links, each composed of two inherently-elastic plates arranged side by side, constructed with keyhole-slots and springing or spreading laterally, and cross-pins connecting the links through the keyhole-slots and having shoulders against which the inherently-elastic plates spring, said cross-pins rotatable in said keyhole-slots and removable laterally therefrom at will to disconnect the links whenever required, substantially as described.

In testimony whereof we have hereunto set our hands in presence of two subscribing witnesses.

AUGUST C. SCHAEFER.
HENRY J. GRAY.

Witnesses:
THOS. C. CONNORS,
R. M. GRADY.